US012300104B2

(12) United States Patent
Ealey

(10) Patent No.: US 12,300,104 B2
(45) Date of Patent: May 13, 2025

(54) LIGHTED TRAFFIC CONTROL DEVICE

(71) Applicant: FLEX TRAFFIC SYSTEMS, LLC, Mesa, CO (US)

(72) Inventor: Jennifer Ealey, Collbran, CO (US)

(73) Assignee: FLEX TRAFFIC SYSTEMS, LLC, Collbran, CO (US)

( * ) Notice: Subject to any disclaimer, the term of this patent is extended or adjusted under 35 U.S.C. 154(b) by 200 days.

(21) Appl. No.: 18/057,275

(22) Filed: Nov. 21, 2022

(65) Prior Publication Data

US 2023/0162600 A1 May 25, 2023

Related U.S. Application Data

(60) Provisional application No. 63/264,455, filed on Nov. 23, 2021.

(51) Int. Cl.

| | |
|---|---|
| ***G08G 1/0955*** | (2006.01) |
| ***F21K 9/237*** | (2016.01) |
| ***F21V 21/08*** | (2006.01) |
| *F21W 111/02* | (2006.01) |
| *F21W 131/103* | (2006.01) |
| *F21Y 115/10* | (2016.01) |

(52) U.S. Cl.

CPC ........... *G08G 1/0955* (2013.01); *F21K 9/237* (2016.08); *F21V 21/0824* (2013.01); *F21W 2111/02* (2013.01); *F21W 2131/103* (2013.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 2006/0257205 A1* | 11/2006 | Jordan | .................... | E01F 9/559 404/16 |
| 2009/0267794 A1* | 10/2009 | Chang | ..................... | G09F 9/302 340/907 |
| 2009/0284393 A1* | 11/2009 | Ochiai | ...................... | G09F 9/33 340/815.45 |
| 2014/0197955 A1* | 7/2014 | Martin | .................... | E01C 17/00 340/584 |
| 2016/0230784 A1* | 8/2016 | Shani | ........................ | F03G 7/08 |
| 2018/0253964 A1* | 9/2018 | Wong | .................. | G08G 1/0141 |
| 2018/0281665 A1* | 10/2018 | Stelzl | .................. | B60Q 1/2673 |

* cited by examiner

*Primary Examiner* — John F Mortell

(74) *Attorney, Agent, or Firm* — Trenner Law Firm, LLC; Mark Trenner

(57) ABSTRACT

A lighted traffic control device is disclosed as it may be implemented to bring attention to approaching lane closures and other work zone strategies a mat configured for placement on a road surface. An example lighted traffic control device includes an independent power source integral with the mat. The example lighted traffic control device also includes an LED lighting circuit having a plurality of LED lights inset into the mat in a configuration corresponding to a road sign. The example lighted traffic control device also includes a control circuit integral with the mat to operate the LED lighting circuit according to a road or lane closure plan.

19 Claims, 7 Drawing Sheets

LIGHTED TRAFFIC CONTROL DEVICE

CROSS-REFERENCE TO RELATED APPLICATIONS

This application claims the priority filing benefit of U.S. Provisional Patent Application No. 63/264,455 filed Nov. 23, 2021 for "Lighted Traffic Control Device" of Jennifer Ealey, hereby incorporated by reference in its entirety as though fully set forth herein.

BACKGROUND

Work zones on highways and roadways are extremely dangerous for the work crews. Even with extensive signage and road barriers, workers are killed in work zones every year. Often, drivers will say that road signage "disappears" (or blends into the background) because of the numerous clutter of signs (both road signs and commercial signs) already seen daily by motorists alongside the roadway. As such, many drivers do not even notice work zone signage on the side of the road when entering a work zone.

DETAILED DESCRIPTION

A lighted traffic control device is disclosed which may be utilized in work zones as a temporary traffic control device for the use on roadways. An example lighted traffic control device may be implemented as a mat configured for placement on a road surface to bring attention to approaching lane closures and other work zone strategies.

In an example, the lighted traffic control device includes an independent power source integral with the mat. The example lighted traffic control device also includes an LED lighting circuit having a plurality of LED lights inset into the mat in a configuration corresponding to a road sign. The road sign may be permanently embedded in the mat, or configurable, e.g., by turning LED lights on/off according to a pattern. The example lighted traffic control device also includes a control circuit integral with the mat to operate the LED lighting circuit according to a road or lane closure plan.

The example lighted traffic control device may include universally known traffic control colors such as those used by nearly every country throughout the world. This makes the lighted traffic control device recognizable by nearly all drivers globally. The example lighted traffic control device can help to decrease the number of accidents and fatalities due to distracted or drowsy drivers, by "grabbing" the drivers attention where the driver is most likely to be looking—at the road ahead.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

Figure 1:
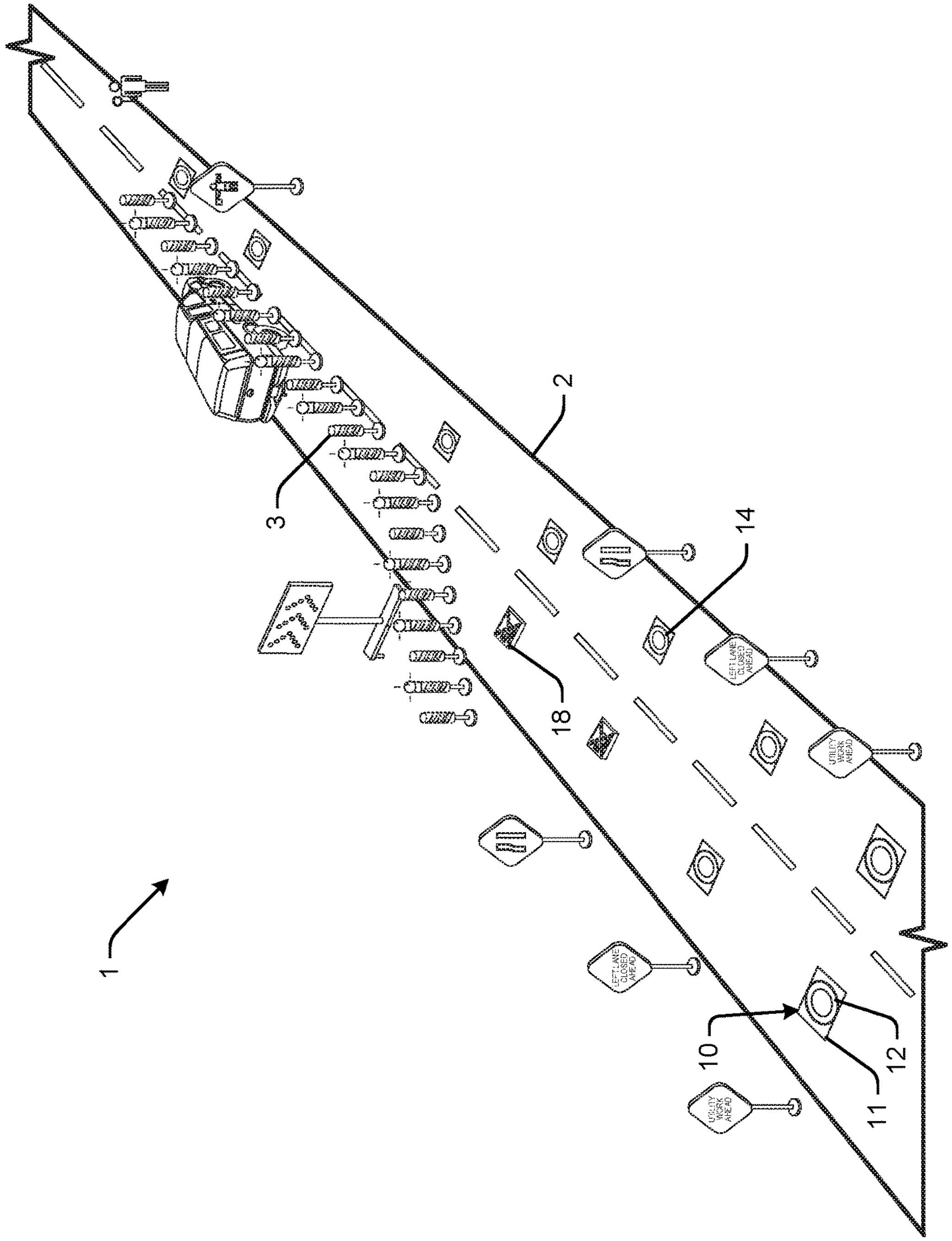
FIG. 1 illustrates an implementation of example lighted traffic control devices configured to provide drivers with warnings in a work zone that is partially closed for road repair.

FIG. 1 illustrates an implementation of example lighted traffic control devices configured to provide drivers with warnings in a work zone 1 that is partially closed for road repair.

An example lighted traffic control device 10 includes a mat 11 which can be driven over and has inlaid solar panels, a chargeable battery pack, and a designated lighting pattern 12. Example light patterns 12 may be generated by light emitting diodes (LEDs) and may include by way of example, a green "O" 14 to indicate a travel lane, a yellow "O" 16 to indicate caution (the lane is ending), and a red "X" 18 to indicate a lane closure. Other colors and/or light patterns 12 may also be provided, such as but not limited to one or more arrows (see, e.g., FIG. 6).

The lighted traffic control device 10 is configured for positioning on a road 2 to bring attention to approaching lane closures 3 and other work zone strategies (e.g., rerouting traffic, slowing traffic). It is noted that motorists are statistically more likely to straddle an object in the roadway rather than run it over. With that in mind the example lighted traffic control device 10 may be designed for widths from about 3-4 feet. In an example, the mat is about 3 inches tall and about 3 feet wide by 3 feet long. However, larger and smaller configurations are also contemplated for other application needs.

In an example, the lighted traffic control device 10 is capable of withstanding force and weight of trucks, vehicles, and equipment traveling over the roadway. For example, the mat 11 may be made of rubber and/or other hard material, and the LED lights, solar panels, and circuitry may be embedded in the mat. In an example, the LED lights, solar panels, and circuitry are waterproof for all weather applications. The example lighted traffic control device 10 may also have a no-slip design to reduce movement on the roadway.

The traffic control device 10 may include a heavy rubber mat suitable for driving over by vehicular traffic or a mat that is not readily picked up by wind or airflow generated by passing vehicles. The example lighted traffic control device may be temporarily adhered to pavement by the use of mechanical fasteners or adhesive or other anti-slip (e.g., friction) pads (see, e.g., pad 13 in FIG. 3).

In an example, traffic control device 10 may include at least one mat attachment to attach the mat 11 on or near the road surface 2. For example, the mat attachment 20 shown in FIG. 3 includes one or more spike 21 or other fasteners which may be provided through a corresponding opening 22 formed through the mat 11 and driven into the ground or roadway to secure the mat on or near the road surface 2. However, other mat attachments may also be provided instead of or in addition to the mat attachment 20, such as an adhesive, weight, chain, etc.

Figure 2:
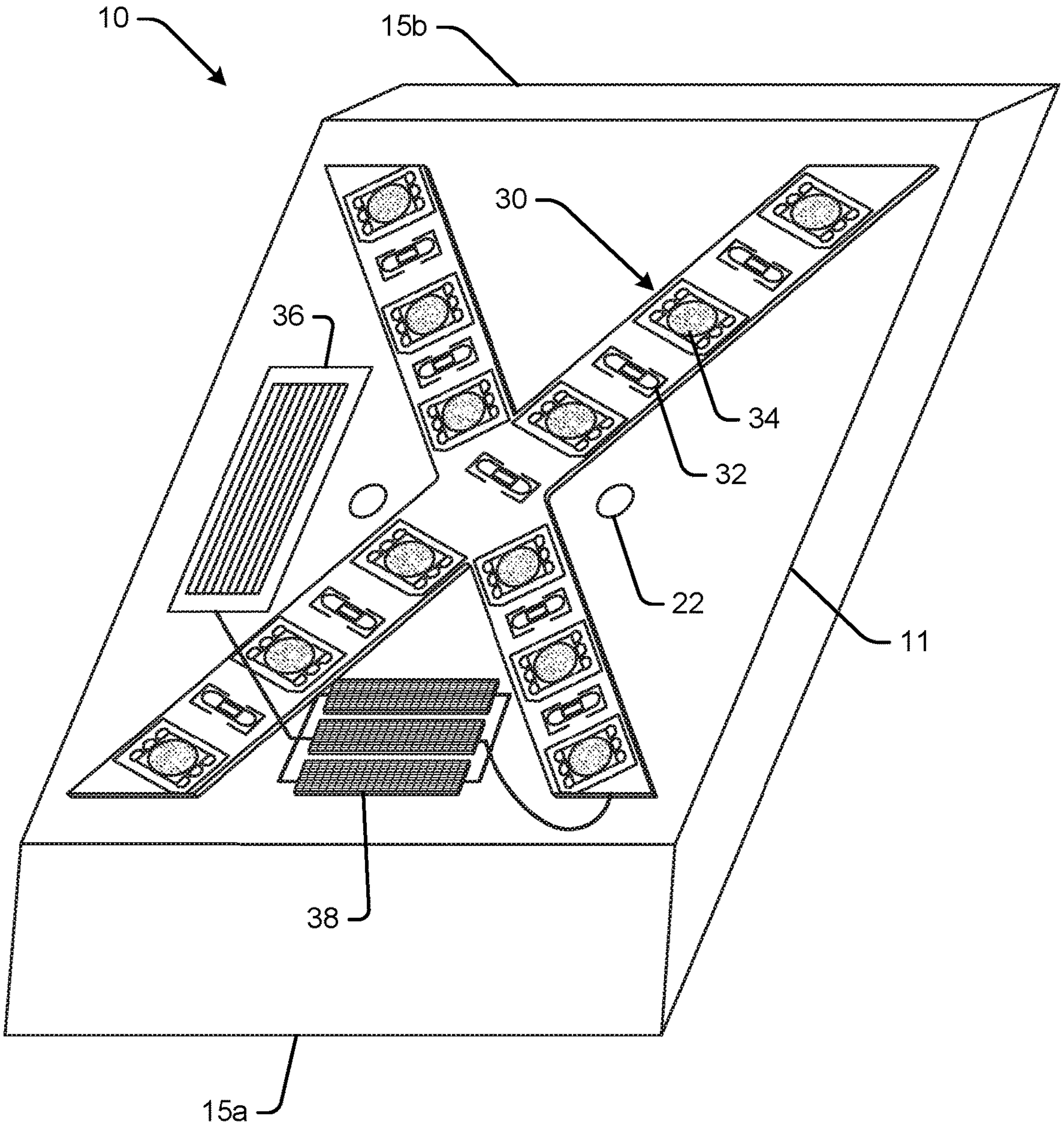
FIG. 2 is a perspective view of an example lighted traffic control device.
Figure 3:
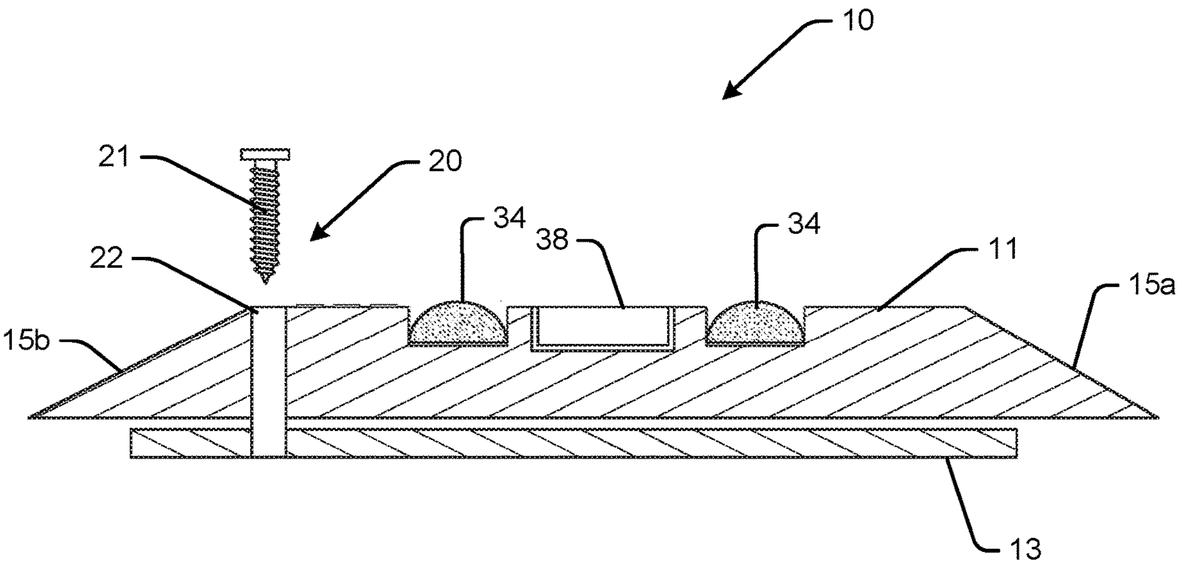
FIG. 3 is a side cross-sectional view of the example lighted traffic control device shown in FIG. 2.
Figure 4:
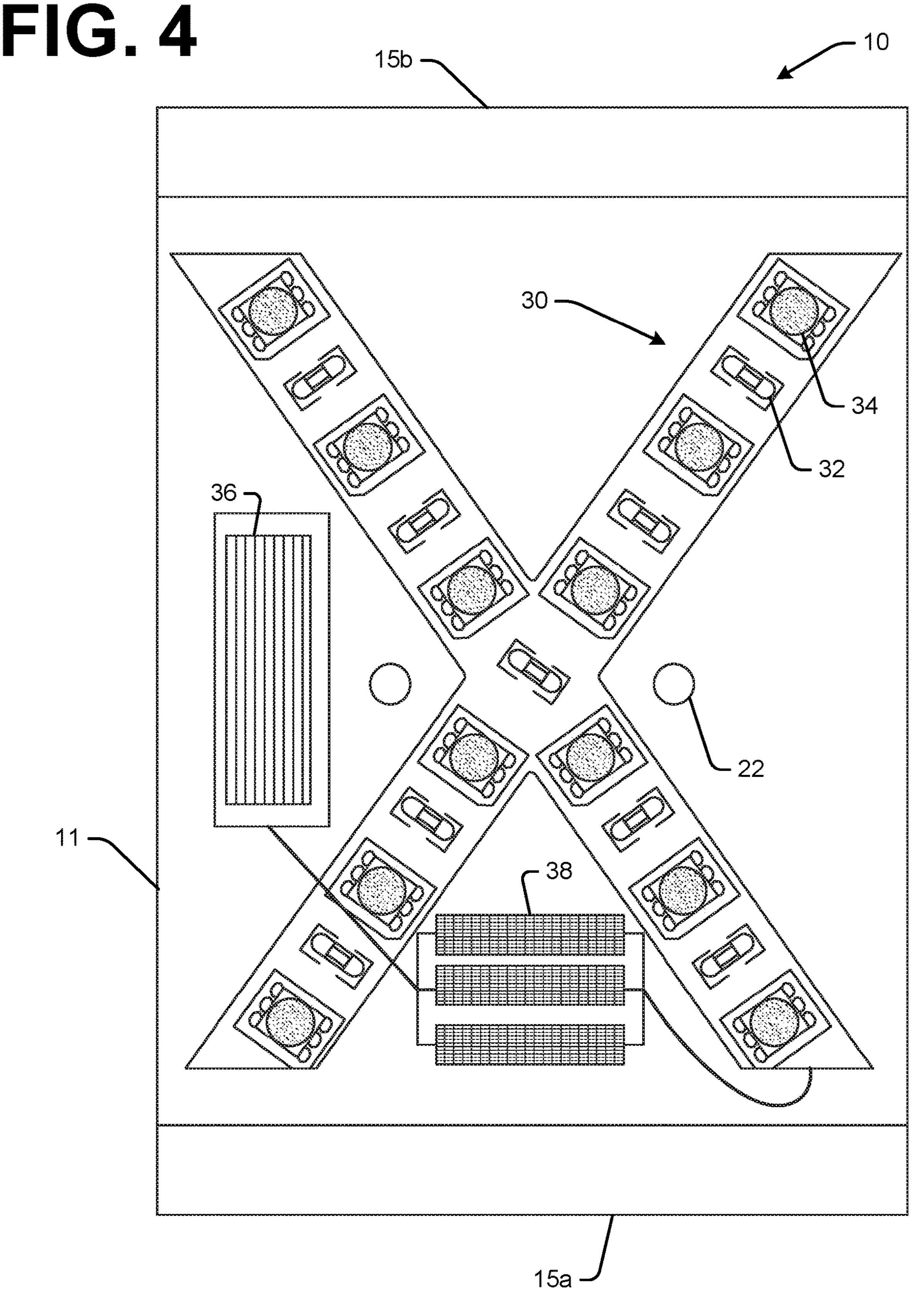
FIG. 4 is a top plan view of the example lighted traffic control device shown in FIG. 2 having an X-shape pattern.

FIG. 2 is a perspective view of an example lighted traffic control device 10. The mat 11 is shown as it may have angled entry and exit planes 15*a*, 15*b* in the event a vehicle tire travels over the mat 11. FIG. 3 is a side cross-sectional view of the example lighted traffic control device shown in FIG. 2. FIG. 4 is a top plan view of the example lighted traffic control device shown in FIG. 2 having an X-shape lighting pattern 30. The example lighted traffic control device 10 includes a mat 11 configured for placement on a road surface, and LED lights. The LED lights may be embedded into the mat (see, e.g., FIG. 3).

In an example, an LED lighting circuit 32 includes a plurality of LED lights 34. The LED lights may be provided on an LED strip or ribbon. In an example, the LED lights 34 are inset into the mat 11 to reduce or prevent damage to the LED lights 34. The LED lights 34 may be provided in a configuration or light pattern corresponding to a road sign. In this example, the LED lights 34 form an X-shape pattern 30.

The LED lights 34 are operated by a control circuit 36 integral with the mat 11. The LED lights 34 may be operated according to a road or lane closure plan. The LED lights 34 may be operated to generate any suitable output (e.g., color, brightness, and even the pattern itself) to bring attention to approaching lane closures and other work zone strategies.

In an example, the control circuit 36 may be pre-programmed (e.g., from the manufacturer) to generate a desired lighting output. In another example, the control circuit 36 is programmable. In another example, the control circuit 36 may be programmed on site, e.g., by an operator configuring the control circuit 36 on-board the device 10. In another example, the control circuit 36 receives a remote control signal. For example, the control circuit 36 may receive a remote control signal to configure and/or update output of the LED lights 34. This helps keep the user from having to go out onto the roadway to activate/deactivate and/or change output of the LED lights 34.

In an example, the LED lights 34 may be colored and/or the light output color may be changed. For example, the output color of the LED lights 34 may be at least one of "stop" red, "go" or "proceed" green, and a "warning" yellow, e.g., as may be defined by traffic safety standards. The output color of the LED lights 34 may be controllable (e.g., by the control circuit 36) to switch between the different colors. By way of illustration, the color output by the LED lights 34 may be changed from yellow to red or from red to green, depending on the needs at the worksite. Of course, other colors may also be utilized as needed by the end-user and/or application (e.g., for parade routes, for processions, etc.).

The control circuit 36 and LED lights 34 are powered by an independent (i.e., receiving no outside power) on-board power source 38 provided integral with the mat 11. In an example, the power source 38 is at least one solar panel embedded in the mat 11. The power source 38 may also include at least one battery. For example, the power source 38 includes one or more rechargeable batteries and at least one solar panel to recharge the battery. In another example, electrical power may be provided by a separate power source (e.g., a separate mat having one or more power sources to provide electrical power to one or more adjacent mats).

Figure 5:
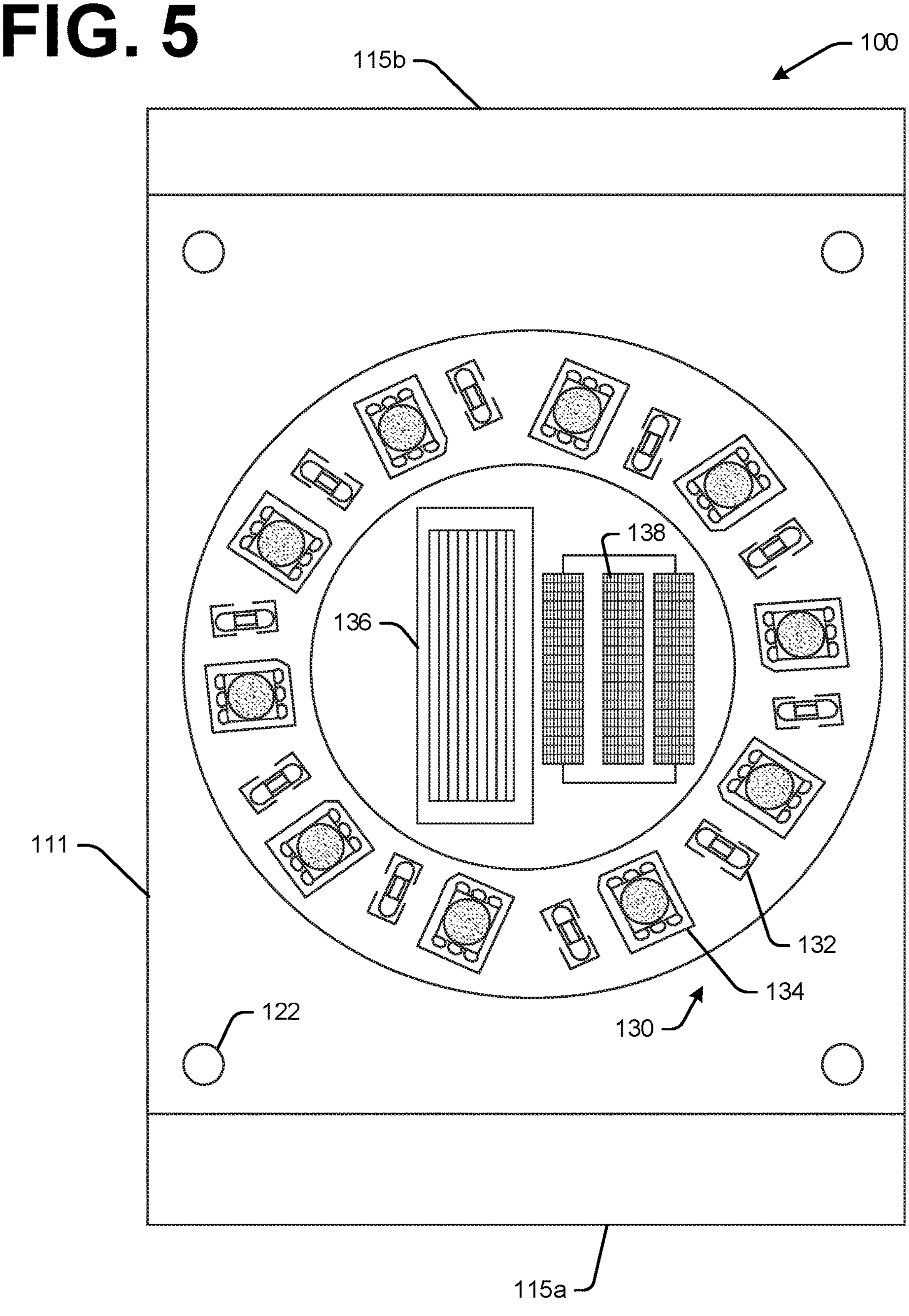
FIG. 5 is a top plan view of another example lighted traffic control device having a circle shape pattern.

FIG. 5 is a top plan view of another example lighted traffic control device 100 having a circle or "O" shape pattern 130. It is noted that 100-series reference numbers are used to describe corresponding parts already described above and may not be described again with reference to FIG. 5 where that description would otherwise be the same as previously described.

In an example, an LED lighting circuit 132 includes a plurality of LED lights 134. The LED lights may be provided on an LED strip or ribbon. In an example, the LED lights 134 are inset into the mat 111 to reduce or prevent damage to the LED lights 134. The LED lights 134 may be provided in a configuration or light pattern corresponding to a road sign. In this example, the LED lights 134 form an "O" shape pattern 130.

The LED lights 134 are operated by a control circuit 136 integral with the mat 111. The LED lights 134 may be operated according to a road or lane closure plan. The LED lights 134 may be operated to generate any suitable output (e.g., color, brightness, and even the pattern itself) to bring attention to approaching lane closures and other work zone strategies.

Figure 6:
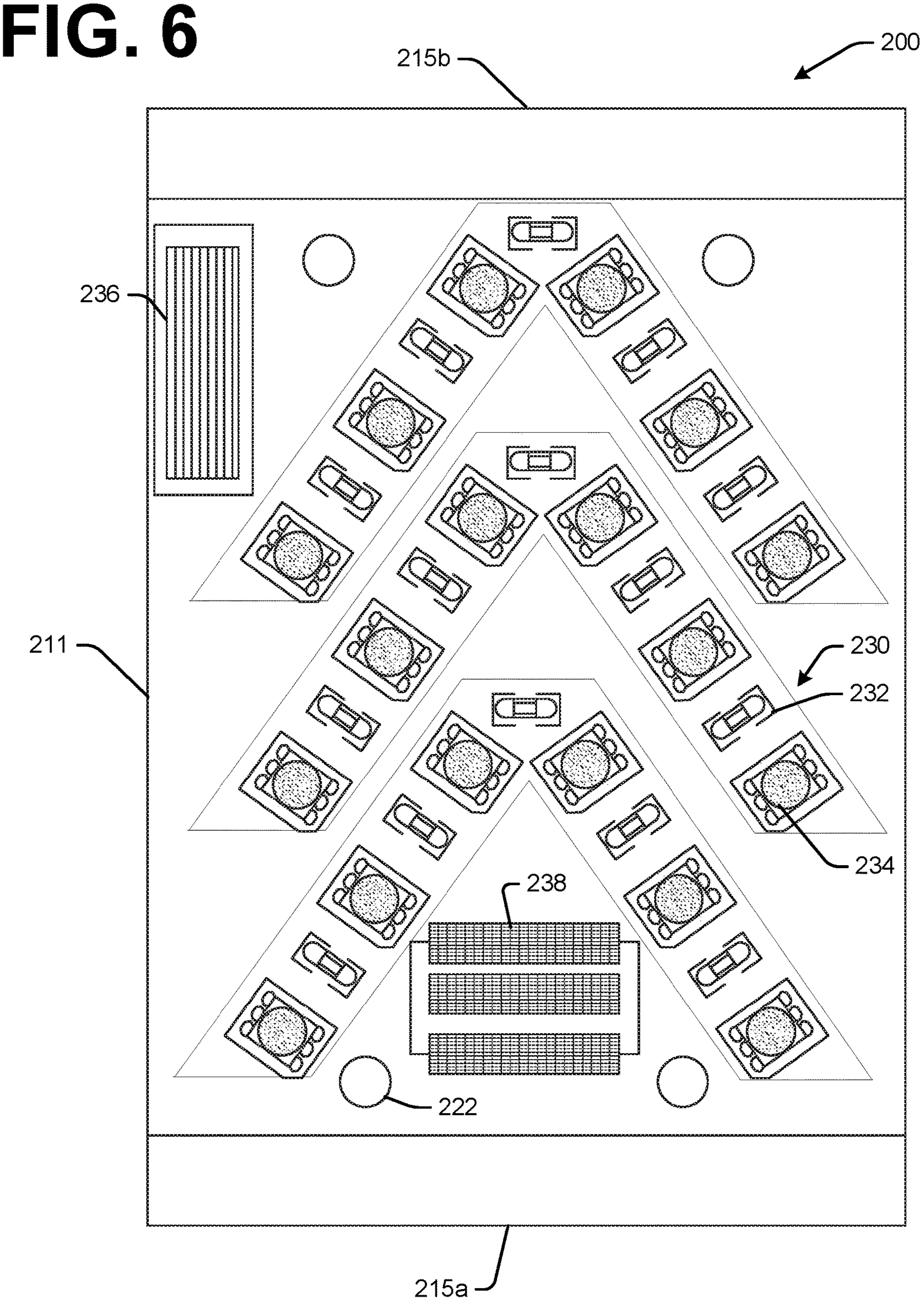
FIG. 6 is a top plan view of another example lighted traffic control device having an arrow shape pattern.

FIG. 6 is a top plan view of another example lighted traffic control device 200 having an arrow shape pattern 230. It is noted that 200-series reference numbers are used to describe corresponding parts already described above and may not be described again with reference to FIG. 6 where that description would otherwise be the same as previously described.

In an example, an LED lighting circuit 232 includes a plurality of LED lights 234. The LED lights may be provided on an LED strip or ribbon. In an example, the LED lights 234 are inset into the mat 211 to reduce or prevent damage to the LED lights 234. The LED lights 234 may be provided in a configuration or light pattern corresponding to a road sign. In this example, the LED lights 234 form arrow shape pattern 230.

The LED lights 234 are operated by a control circuit 236 integral with the mat 211. The LED lights 234 may be operated according to a road or lane closure plan. The LED lights 234 may be operated to generate any suitable output (e.g., color, brightness, and even the pattern itself) to bring attention to approaching lane closures and other work zone strategies. For example, the arrows may be lit and dimmed or turned off sequentially to indicate forward motion. Or for example, 1 or more of the arrows may be lit while one or more of the other arrows are not lit. Different arrows may be lit with different colors and/or brightness.

Figure 7:
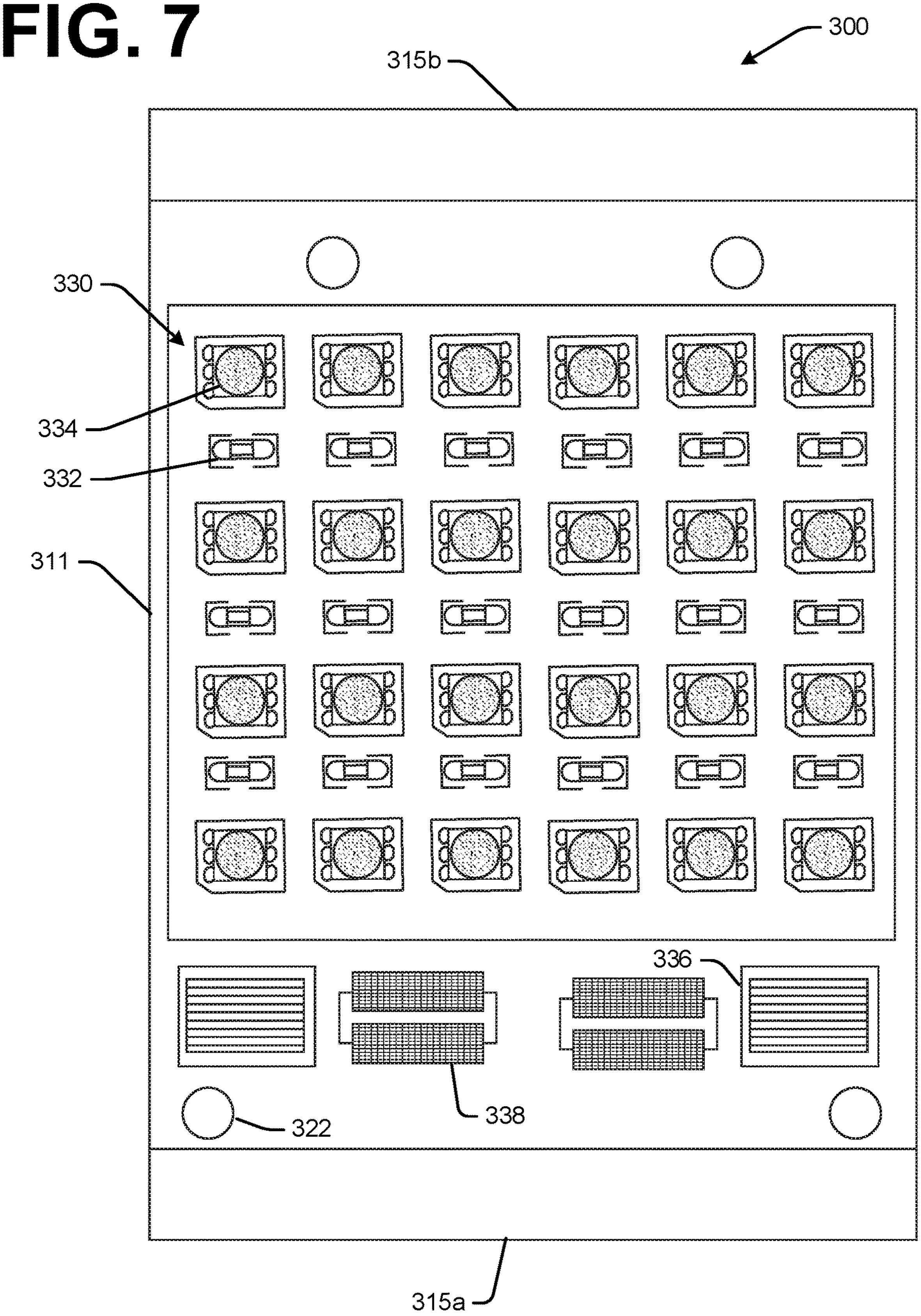
FIG. 7 is a top plan view of another example lighted traffic control device having a configurable pattern.

FIG. 7 is a top plan view of another example lighted traffic control device 300 having a configurable pattern 330. That is, the LED lights 334 are provided as a panel that can be activated to output a plurality of different shape signs. It is noted that 300-series reference numbers are used to describe corresponding parts already described above and may not be described again with reference to FIG. 7 where that description would otherwise be the same as previously described.

In an example, an LED lighting circuit 332 includes a plurality of LED lights 334. The LED lights may be provided as a panel and/or as parallel LED strips or ribbons arranged to configure multiple different patterns of light output corresponding to more than one road sign. In an example, the LED lights 334 are inset into the mat 311 to reduce or prevent damage to the LED lights 334.

The LED lights 334 are operated by a control circuit 336 integral with the mat 311. The LED lights 334 may be operated according to a road or lane closure plan. The LED lights 334 may be operated to generate any suitable output (e.g., color, brightness, and even the pattern itself) to bring attention to approaching lane closures and other work zone strategies. For example, the control circuit 336 may be operable to activate/deactivate the LED lights and to control blinking/solid output, color output, and display different patterns (e.g., the X, 0, the arrows described above, and/or other patterns) to be output by the LED lights 334.

It is noted that the examples shown and described are provided for purposes of illustration and are not intended to be limiting. Still other examples are also contemplated.

The invention claimed is:

1. A lighted traffic control device, comprising:

a road surface mat;

an independent electrical power supply integral with the mat;

an LED lighting circuit having a plurality of LED lights inset into the mat in a configuration corresponding to a road sign; and a control circuit integral with the mat to operate the LED lighting circuit according to a road or lane closure plan to bring attention to approaching lane closures and other work zone strategies;

wherein the LED lights form a plurality of substantially arrow-shapes on the mat, the plurality of substantially arrow-shapes pointing in a same direction and directing traffic.

2. The lighted traffic control device of claim 1, wherein the mat is a heavy rubber mat suitable for driving over by vehicular traffic.

3. The lighted traffic control device of claim 1, wherein the mat is about 3 inches tall and about 3 feet wide by 3 feet long.

4. The lighted traffic control device of claim 1, further comprising at least one mat attachment to attach the mat on or near the road surface.

5. The lighted traffic control device of claim 4, wherein the at least one mat attachment is an adhesive.

6. The lighted traffic control device of claim 4, wherein the at least one mat attachment further comprises at least one opening formed through the mat and a spike or other fastener to be provided through the at least one opening and driven into the ground to secure the mat on or near the road surface.

7. The lighted traffic control device of claim 1, wherein the electrical power supply is at least one solar panel embedded in the mat.

8. The lighted traffic control device of claim 1, wherein the electrical power supply is at least one battery.

9. The lighted traffic control device of claim 1, wherein the electrical power supply is at least one rechargeable battery and at least one solar panel to recharge the at least one rechargeable battery.

10. The lighted traffic control device of claim 1, wherein the LED lights form a substantially X-shaped sign on the mat.

11. The lighted traffic control device of claim 1, wherein the LED lights form a substantially O-shaped sign on the mat.

12. The lighted traffic control device of claim 1, wherein the LED lights form a substantially arrow-shaped sign on the mat.

13. The lighted traffic control device of claim 1, wherein the LED lights are provided as a panel that can be activated to output a plurality of different shape signs.

14. The lighted traffic control device of claim 1, wherein the control circuit is preprogrammed on-board the mat.

15. The lighted traffic control device of claim 1, wherein the control circuit receives a remote control signal.

16. The lighted traffic control device of claim 1, wherein the control circuit receives a remote control signal to configure output of the LED lights.

17. The lighted traffic control device of claim 1, wherein the control circuit is operable to activate/deactivate the LED lights and to control blinking/solid output, color output, and display pattern output of the LED lights.

18. The lighted traffic control device of claim 1, wherein output color of the LED lights is at least one of red, green, and warning yellow.

19. The lighted traffic control device of claim 1, wherein output color of the LED lights is controllable to switch between the different colors.

* * * * *